United States Patent
Mathis

(10) Patent No.: US 10,285,326 B2
(45) Date of Patent: May 14, 2019

(54) METHODS OF SOWING SEEDS

(71) Applicant: Seedway, LLC, Hall, NY (US)

(72) Inventor: Craig Mathis, Eddyville, KY (US)

(73) Assignee: Seedway, LLC, Hall, NY (US)

( * ) Notice: Subject to any disclaimer, the term of this patent is extended or adjusted under 35 U.S.C. 154(b) by 10 days.

(21) Appl. No.: 15/364,759

(22) Filed: Nov. 30, 2016

(65) Prior Publication Data

US 2018/0146614 A1    May 31, 2018

(51) Int. Cl.
| | |
|---|---|
| A01C 21/00 | (2006.01) |
| A01G 9/02 | (2018.01) |
| A01G 17/02 | (2006.01) |
| A01G 22/05 | (2018.01) |
| A01G 9/08 | (2006.01) |
| A01G 22/00 | (2018.01) |
| A01G 9/029 | (2018.01) |

(52) U.S. Cl.
CPC .......... *A01C 21/005* (2013.01); *A01G 9/0295* (2018.02); *A01G 9/085* (2013.01); *A01G 22/00* (2018.02); *A01G 22/05* (2018.02)

(58) Field of Classification Search
CPC ...... A01C 21/005; A01C 21/00; A01G 9/028; A01G 9/00; A01G 17/005; A01G 17/00; A01G 17/02; A01G 22/00; A01G 9/0295; A01G 9/029; A01G 9/02; A01G 9/085; A01G 9/08
USPC ......... 111/200, 900, 906–915; 800/308, 298, 800/295
See application file for complete search history.

(56) References Cited

U.S. PATENT DOCUMENTS

| | | | |
|---|---|---|---|
| 8,418,635 B2 | 4/2013 | Gill et al. | |
| 8,418,637 B2 | 4/2013 | Gill et al. | |

OTHER PUBLICATIONS

Hassell et al., Seedless Watermelon Transplant Production Guidelines, [retrieved from the Internet on Apr. 15, 2010]. Mar. 7, 2002.*
Sakata Vegetables, Product Description SSX8585 F1 Allsweet Watermelon, All/Pollenizer/Diploid, http://www.sakatavegetables.com/index.cfm/fuseaction/plants.printDetail/plant_ID/372/index.htm , accessed Nov. 30, 2016.
Sakata Vegetables, Product Description Ace Watermelon, All/Pollenizer/Diploid, http://www.sakatavegetables.com/vegetable/Baby-Leaf-All/Watermelon-Citrullus-Ace. accessed Nov. 30, 2016.
Sakata Vegetables, Product Description Wild Card Watermelon, All/Pollenizer/Diploid, http://www.sakatavegefables.com/vegetable/Watermelon-All/Watermelon-Citrullus-Wild-Card-Hybrid, accessed Nov. 30, 2016.
Origene Seeds, Product Description, The Pollenizers, Lion 6 and ORS 110, www.origeneseeds.com, accessed Nov. 30, 2016.
Syngenta, Watermelon Crop Guide, Seeded Varieties, p. 11, http://www.syngenta-us.com/seeds/vegetables/Watermelon/watermelon_crop_guide.pdf, accessed Nov. 30, 2016.

(Continued)

*Primary Examiner* — Christopher J. Novosad
(74) *Attorney, Agent, or Firm* — Dorsey & Whitney LLP

(57) ABSTRACT

A method of sowing watermelon seeds includes seeding triploid watermelon seeds and watermelon pollinizer seeds in separate cells within a seedling tray. The triploid watermelon seeds produce seedless watermelons and the pollinizer seeds produce seeded watermelons. The seeded watermelons are not inherently bred to have reduced competition to plants grown from the triploid watermelon seeds.

19 Claims, 4 Drawing Sheets

(56) References Cited

OTHER PUBLICATIONS

Syngenta, Watermelon Crop Guide, SP-6, Full Count Deuces, pp. 13/14, http://www.syngenta-us.com/seeds/vegetables/watermelon/watermelon_crop_guide.pdf, accessed Nov. 30, 2016.
Nunhems Watermelon Catalog, 20 pgs, http://www.nunhemsusa.com/www/NunhemsInternet.nsf/CropData/US_EN_WMW/$file/US_EN_WMW%20CATALOG.pdf, accessed Nov. 30, 2016.
Sakata Vegetables, Product Description Fantasy F1 Allsweet Watermelon, All/Diploid, http://www.sakatavegetables.com/_ccLib/image/plants/SALESSFIEET-CM-370.pdf, accessed Nov. 30, 2016.
Harris Moran Seed Company, Accomplice (HMX 8920), Tech Sheet, 2014.
Harris Moran Seed Company, Sidekick, Tech Sheet, 2014.
Seminis Product Description Wingman, http://www.seminis-us.com/product/wingman/250, accessed Sep. 9, 2016.

\* cited by examiner

METHODS OF SOWING SEEDS

TECHNICAL FIELD

The present disclosure relates to methods of sowing seeds, such as watermelon seeds. More particularly, the present disclosure provides methods for mingling triploid watermelon seeds with complementary pollinizer seeds that involve sowing one seed per cell in a seedling tray.

BACKGROUND

Seedless watermelons have gained wide popularity due to their consumer appeal and high yield relative to seeded watermelon varieties. As a result, seedless watermelons may often garner above-average market prices. Responsive to heightened consumer demand and market pricing, farming operations have adapted to accommodate increased numbers of watermelon plants bearing seedless fruit.

The seedless trait of watermelons is a result of their triploidy, meaning the nucleus of each seedless watermelon cell contains three copies of each chromosome, instead of two. As such, seeds that produce seedless watermelons are herein referred to as "triploid seeds." During meiosis, the odd number of replicated chromosomes in triploid cells often fail to properly segregate into daughter gamete cells, an outcome that prevents successful fertilization. Because seed formation requires successful fertilization, pollination of the gametes in triploid watermelon plants produces seedless fruit.

The modified genetics of seedless watermelons necessitate a specific pollination scheme. In particular, triploid seedless watermelon plants must be pollinated by the viable pollen produced by diploid watermelon plants bearing seeded watermelons. Because the production of seedless watermelons may be highly prioritized over seeded varieties, the required inclusion of seeded pollinizer plants in the field shrinks the area available for seedless watermelon plants and complicates planting systems. Growers typically strive to include the smallest proportion of seeded pollinizers relative to seedless varieties during sowing and transplanting operations to maximize the number of seedless watermelons grown in each field. On average, commonly-used diploid pollinizers may occupy approximately 20-33% of each field dedicated to growing seedless watermelons. This proportion of diploid pollinizers may generally provide adequate pollen for the seedless recipients grown concurrently in the same field.

Persistent germination difficulties have driven the sale of seedless watermelon varieties to commercial growers as young transplants instead of seeds. Generally, the seeds may be initially sown or planted in multi-cellular seedling trays and allowed to grow in commercial greenhouses. After a period of preliminary growth, the young watermelon plants are often transplanted into multiple fields. The survival of the young watermelon plants in the field may depend largely on their health and development prior to transplantation. Adequate root growth, in particular, may be the rate-limiting step to transplantation. Thus, the initial period of plant growth in seedling trays may be crucial to long-term plant survival.

Preexisting approaches to sowing watermelon seeds may involve sowing triploid watermelon seeds and diploid pollinizer seeds in separate seedling trays. The use of separate trays for pollinizer plants and seedless plants requires the trays be kept separate and well-marked during transport and during transplanting in the field. Other approaches may involve sowing both triploid seeds and pollinizer seeds within the same cells of a seedling tray, so-called "double plants." Thus, despite efforts toward optimization, preexisting methods of sowing seedless watermelon plants remain tightly wed to particularly engineered seed varieties and often require specialized training of sowing personnel, thus rendering such methods inflexible and vulnerable to human error. Other methods limit the number of triploid seeds that can be grown in greenhouses and encumber the transition from greenhouses to fields. Improved sowing methods more universally applicable to a range of seed types, less vulnerable to human error, and yet capable of accommodating high volume production of seedless watermelons are needed.

SUMMARY

In some embodiments, a method of sowing watermelon seeds includes seeding triploid watermelon seeds and watermelon pollinizer seeds in separate cells within a seedling tray. The triploid watermelon seeds produce seedless watermelons and the pollinizer seeds produce seeded watermelons. The seeded watermelons are not inherently bred to have reduced competition to plants grown from the triploid watermelon seeds.

In certain implementations and alternatives, the triploid watermelon seeds or the watermelon pollinizer seeds are seeded by hand in the seedling tray. In additional implementations and alternatives, each of the triploid watermelon seeds and watermelon pollinizer seeds are seeded by hand in the seedling tray. Some embodiments further include using a mechanical seeder to seed at least a portion of the triploid watermelon seeds or the watermelon pollinizer seeds in the seedling tray. In certain implementations and alternatives, the triploid watermelon seeds and watermelon pollinizer seeds are seeded by a mechanical seeder in the seedling tray.

In certain implementations and alternatives, the triploid watermelon seeds include one or more varieties of triploid watermelon seeds. In some embodiments, the watermelon pollinizer seeds include one or more varieties of watermelon pollinizer seeds.

In certain implementations and alternatives, the watermelon seeds are seeded at a ratio of triploid watermelon seeds to watermelon pollinizer seeds of about 5:1, 4:1, 3:1, or 2:1 in the seedling tray. In certain implementations and alternatives, the seedling tray may include a watermelon pollinizer seed in every second, third, fourth, fifth, or sixth cell. In some embodiments, the seedling tray containing the triploid watermelon seeds and the watermelon pollinizer seeds has mirror image symmetry.

In certain implementation and alternatives, methods include seeding, by hand, triploid watermelon seeds and watermelon pollinizer seeds in separate cells within one or more additional seedling trays. In certain implementations and alternatives, methods include growing the triploid watermelon seeds and watermelon pollinizer seeds in the seedling tray for a preliminary growth period to produce seedless watermelon plants and watermelon pollinizer plants. In some embodiments, the preliminary growth period is about three to about eight weeks. Methods may include transplanting the seedless watermelon plants and watermelon pollinizer plants in a field after the preliminary growth period. In some embodiments, the seedless watermelon plants are pollinated by the watermelon pollinizer plants. In certain implementations and alternatives, methods include adding an equal amount of water to each cell of the seedling tray at consistent intervals during the preliminary growing period.

In certain implementations and alternatives, the watermelon pollinizer plants produce edible fruit. In some examples, the watermelon pollinizer plants may grow at a similar or a faster rate than the triploid watermelon plants.

In some embodiments, a sown seedling tray includes a seedling tray having a plurality of planting cells; planting material arranged within the planting cells; and one watermelon seed per cell. The watermelon seed is a triploid watermelon seed or a pollinizer seed. The triploid watermelon seed produces a seedless watermelon and the pollinizer seed produces a seeded watermelon which is not inherently bred to have reduced competition for the production of triploid watermelons.

DETAILED DESCRIPTION

Figure 1:
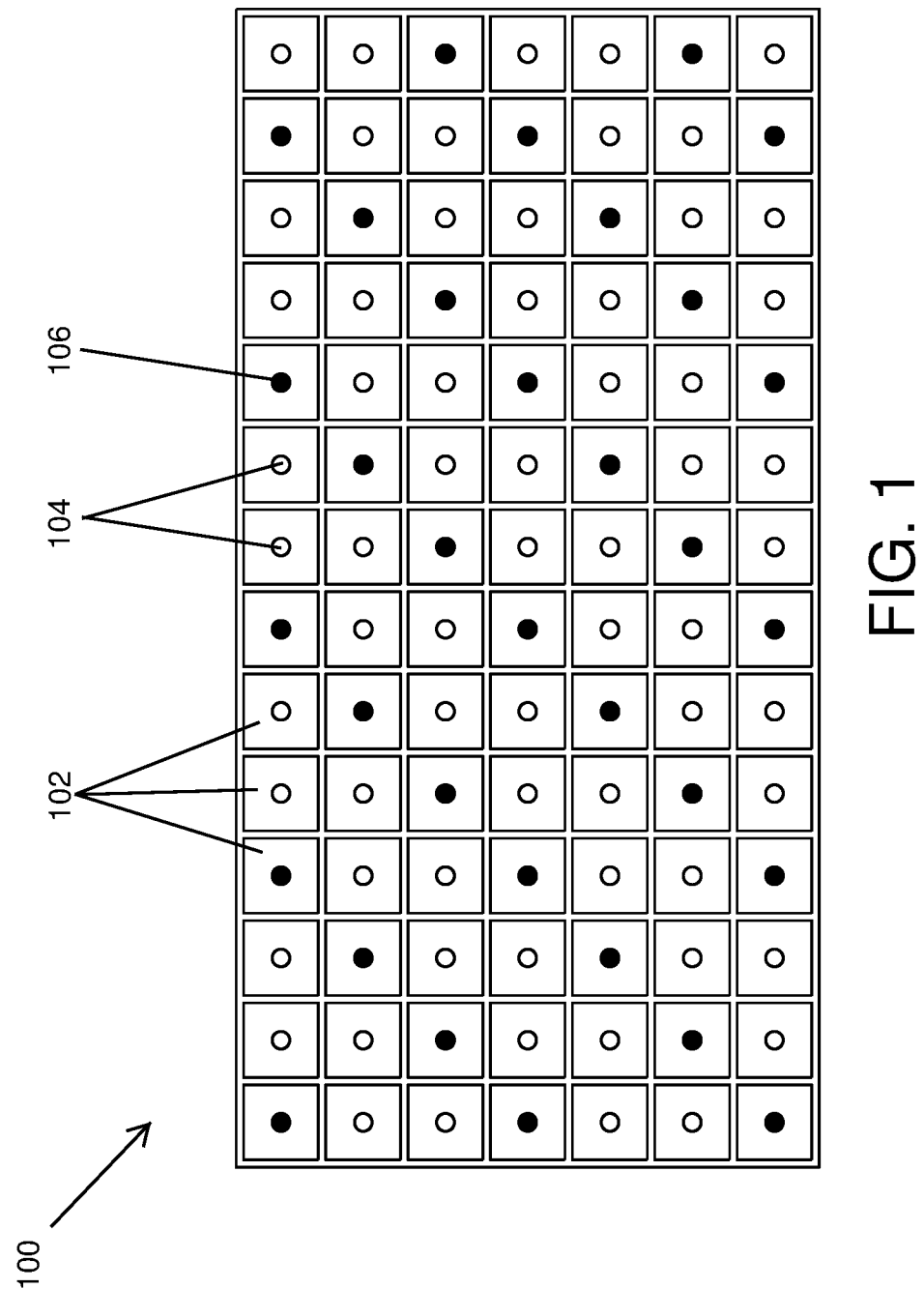
FIG. 1 is a schematic illustration of a plan view of a seedling tray containing triploid watermelon seeds and pollinizer seeds.

Overview: The methods disclosed herein may provide improved methods of growing seedless watermelons. Such methods may involve sowing seeds that produce seedless watermelons and complementary watermelon pollinizer seeds in the same seedling tray such that only one seed may be sown in each cell of the tray. This is in contrast to prior "double-plant" approaches described herein, which rely on the use of particularly-engineered pollinizer seed varieties, e.g., non-harvestable. Particularly, Applicant discovered these approaches force seedless plants to share soil nutrients, water, and other resources with their pollinizer counterparts, ultimately to the detriment of the seedless plant. In addition, not accustomed to sowing multiple seeds within single cells of each seedling tray, these techniques may further necessitate specialized training of sowing personnel. Moreover, not accustomed to observing multiple seedlings growing within single cells of each seedling tray in the "double-plant" approach, these techniques may further necessitate specialized training of field personnel required to transplant watermelon plants (e.g., seedlings) in the field.

Triploid and/or pollinizer seeds may be sown in the different cells of the tray according to a specific, predetermined arrangement to ensure sufficient pollination of each seedless watermelon plant later transplanted into a field site. In some examples, watermelon pollinizer seeds may include non-enhanced seed types. As discussed herein, such methods may simplify growing operations, thereby enhancing efficiency and reducing the likelihood of human error throughout the growing process. Additionally, the disclosed methods may diminish variability in plant growth and development, decrease the amount of wasted plant products, and/or boost the overall yield of seedless watermelons.

I. Sown seedling trays: In embodiments, sown seedling trays include a plurality of individual planting cells that hold planting material and one watermelon seed or seedling per cell, with each cell containing one of a triploid watermelon seed, a triploid watermelon seedling, a pollinizer, or a pollinizer seedling. For instance, each cell may include either a triploid watermelon seed or a pollinizer seed. In another example, each cell may include either a triploid watermelon seedling or a pollinizer seedling.

Seedling trays: Referring to the drawings, FIGS. 1-3 each illustrate a pre-formed seedling tray 100, 200 or 300, respectively. The seedling trays 100, 200, 300 include a plurality of planting cells 102. As further discussed below, each planting cell 102 may be filled with an amount of planting material, into which a triploid watermelon seed 104 or a pollinizer seed 106 is planted. As shown, each planting cell 102 may have approximately equal dimensions. In embodiments, the number of planting cells 102 within each seedling tray 100, 200, 300 may vary. For instance, larger seedling trays may include a greater number of planting cells. The seedling tray 100 shown in FIG. 1 includes 98 planting cells arranged in 7 rows and 14 columns. The seedling tray 200 shown in FIG. 2 includes 128 planting cells organized in 8 rows and 16 columns, and the seedling tray 300 shown in FIG. 3 includes 162 planting cells arranged in 9 rows and 18 columns. In additional examples, the number of planting cells 102 within each seedling tray may range from about 10 to about 300 cells, although any number of cells may be included in a given seedling tray. Specific embodiments may include about 10, 40, 60, 98, 128, 200, or about 242 cells per seedling tray. As a whole, the plurality of planting cells included in a seedling tray may define a tray perimeter shape that may be approximately square or rectangular, such as that shown in FIGS. 1-3, including various numbers of rows and columns. The volume and/or shape of each cell within a single seedling tray may also vary. In embodiments, each cell may be approximately square or rectangular, and/or may define a volume ranging from about 30 to about 50 $cm^3$. In some examples, the planting cell dimensions may vary within a given seedling tray. For example, the planting cells may alternate in size such that every second, third, fourth, fifth, or sixth planting cell is larger or smaller than each of the intervening cells. In embodiments, the different planting cell dimensions may coincide with different seed varieties.

Planting material: The planting material used to fill a given seedling tray may vary, and any satisfactory planting material may be used. For instance, planting material may include soilless planting mixes, natural soils, vermiculite, peat, horticultural perlite, fertilizer compositions, mineral compositions, nutrient compositions and/or any combination thereof. In some examples, one or more supplementary planting materials, e.g., fertilizers, minerals and/or nutrients, may be unnecessary, or may be necessary at reduced levels compared to other growing approaches that do not involve the sowing schemes disclosed herein.

Triploid watermelon seeds: Seeds that produce seedless watermelon plants, the triploid seeds 104, may include any variety of seeds that develop into watermelon plants that can be pollinated by a corresponding watermelon pollinizer plant and subsequently develop seedless watermelon fruit. Various types of triploid seeds may be used according to the methods discussed herein. In some examples, the triploid seeds may be naturally bred, bred under selective pressures and/or genetically modified. In embodiments, the triploid seeds may produce seedless watermelon plants with distinct traits. For example, in addition to lacking true seeds (e.g., hard seed coat with embryo), or at least a portion of the seeds typically present in seeded watermelons, the seedless watermelons may be larger, may contain more sugar and/or may be longer lasting than seeded watermelons grown in similar conditions. The seedless watermelon plants may also develop modified plant parts more susceptible to pollination via the air and/or insects. For instance, seedless watermelon plants may include modified pistils having an elongated style that may increase the exposure of the stigma to the environment and/or pollinators. In addition or alternatively, each modified pistil may include a stigma with enhanced adhesion properties relative to typical varieties, for example.

In embodiments, the seeds capable of producing seedless watermelons may not be triploid. According to such embodiments, the seeds may include aneuploid cells having various numbers of chromosome pairs. In some examples, the number of chromosome pairs may be an odd number.

Pollinizer seeds: Various types of pollinizer seeds 106 may be used consistent with the embodiments disclosed herein. The pollinizer seeds according to the present disclosure may be diploid. In some examples, the pollinizer seeds may be naturally bred. Further, the pollinizers may not be inherently bred to have reduced competition to plants grown from the triploid watermelon seeds. Alternatively, some pollinizers may be bred under selective pressures and/or genetically modified. Particular types of pollinizer seeds that may be used may include but not limited to one or more varieties sold under the commercial names Wildcard, Wildcard Plus, Ace, Ace Plus, SSX 8585, ORS 110, Nunhems 800, Nunhems 860, Nunhems 790, Nunhems Montreal, Polimax, Premium, Fantasy, and/or Wingman. Such pollinizer seeds may not have been bred to have reduced competition to plants grown from the triploid watermelon seeds, and may also be referred to as non-enhanced pollinizer seeds.

The pollinizer seeds used herein that are not inherently bred to have reduced competition for the production of triploid watermelons may develop into pollinizer plants that compete with the plants grown from the triploid seeds. In such embodiments, the pollinizer seeds are given a dedicated space to grow in a cell, pollinizer seedlings continue to grow in the dedicated space of the cell, and by virtue of the seedling being planted individually are each given a dedicated space to grow in the field, and thus may produce pollinizers with a competitive watermelon plant and/or may produce watermelons that require harvesting prior to the seedless watermelons produced from the triploid watermelon seeds.

The pollinizer seeds may develop into pollinizer plants with various phenotypic traits. For instance, the pollinizer seeds may develop into plants bearing harvestable and/or edible fruit. In embodiments, the edible fruit may include high yield, marketable fruit. Thus, embodiments of the disclosed technology may enable the commercial sale of both seedless watermelons and watermelons grown from corresponding pollinizer plants. Fruit grown from pollinizer plants may contain seeds. The fruit grown from pollinizer plants may have one or more distinct characteristics. For example, the fruit may be one or more unique colors, e.g., white or yellow. The fruit may also be uniquely sized. In some examples, the pollinizer plant watermelons may be smaller than traditionally marketed watermelons. Pollinizer seeds may also develop into plants bearing inedible fruit. In embodiments, the pollinizer plants may bear no fruit whatsoever.

In some examples, the pollinizer seeds may not include enhanced seed varieties, which may be referred to commercially as "super pollinizers" or "SP-". Such enhanced seeded varieties may produce watermelon plants that are inherently bred to have reduced competition to plants grown from the triploid watermelon seeds, and may have smaller leaves, smaller vines and/or more brittle rinds relative to the pollinizer plants grown from non-enhanced seed types herein. Specific varieties of enhanced pollinizer seeds not used in some embodiments may include SP-1, SP-4 and/or SP-6, each offered by Syngenta Seeds, Inc. In addition or alternatively, embodiments may exclude commercial enhanced pollinizer seed varieties such as Sidekick and Accomplice, each sold by Harris Moran, and Patron, sold by Zeraim Gedara.

In embodiments, non-enhanced pollinizer seed types sown according to the methods herein may produce watermelon plants phenotypically distinct from plants produced from enhanced pollinizer seed varieties, e.g. super pollinizers. For instance, in contrast to enhanced pollinizer plants that may produce small watermelons, if any watermelons at all, pollinizer seeds sown according to the methods herein may produce one or more watermelons each having non-brittle rinds. Pollinizer seeds sown according to the methods herein may produce one or more watermelons each weighing at least 0.6 pounds, which is in contrast to enhanced pollinizers, which, if fruit is produced at all, results in a watermelon weighing 0.5 pounds or less. In embodiments, the weight of each watermelon grown and/or harvested from non-enhanced pollinizer plants disclosed herein may range from about 0.6 to about 30 pounds, about 1 to 5 pounds, about 2 to about 28 pounds, about 7 to 35 pounds, about 5 to about 26 pounds, about 10 to about 25 pounds, about 15 to about 24 pounds, or about 16 to about 22 pounds. In addition or alternatively, non-enhanced pollinizer plants may produce watermelons each having a sugar and/or moisture content approximately equal to, slightly less than, greater than, or similar to seedless watermelons and/or other varieties of harvestable, edible watermelons. By contrast, watermelons produced by enhanced pollinizer plants, if any, may contain a reduced sugar and/or moisture content. As such, watermelons produced by enhanced pollinizer plants may be inedible and/or lack the characteristic taste of typically-consumed watermelons.

In addition or alternatively, watermelons grown from the pollinizer plants according to the methods herein may develop softer, more malleable, and/or non-brittle rinds more amenable to slicing compared to rinds produced by enhanced pollinizer plants. The rinds produced by non-enhanced pollinizer plants may exhibit an exterior color and/or pattern typical of other edible and/or harvestable watermelon varieties. In some examples, non-enhanced pollinizer plants may grow vines of at least average length, width and/or prolificacy relative to other watermelon plants, e.g., triploid watermelon plants. Enhanced pollinizer plants may, by contrast, grow vines that are smaller in number and/or length. In embodiments, the flowering period of non-enhanced pollinizer plants may be of approximately average duration, which may be shorter than corresponding flowering periods of enhanced watermelon plants. Despite exhibiting a shorter flowering period, the pollinizer plants grown according to the methods herein may maintain or increase seedless watermelon yields.

In some examples, the pollinizer seeds used herein may produce one or more plant parts that resemble triploid watermelon plants. For example, the size and/or number of leaves on the pollinizer plants may be approximately equal to the leaf size and/or leaf number of the seedless watermelon plants. In embodiments, the leaf size and/or leaf number may be smaller or greater than the leaf size and/or leaf number characteristic of the seedless watermelon plants. The pollinizer plants may exhibit an accelerated maturity rate compared to the triploid watermelon plants. Accordingly, the pollinizer plants grown according to the methods herein may require later and/or earlier harvesting than their triploid counterparts. In some examples, the pollinizer plants may develop an approximately average number of male flowers with approximately average flowering times and periods.

II. Methods of sowing watermelon seeds: Initially, methods of sowing watermelon seeds may involve preparing growing conditions conducive to seed germination. Specific growing conditions, e.g., temperature, humidity, lighting, etc., may be selected and maintained in a controlled environment, such as a greenhouse. In some examples, greenhouse conditions may be programmed or timed to vary cyclically.

In embodiments, the seedling trays 100, 200, 300 as provided herein may receive the planting material and watermelon seeds. One or more planting materials may be added to each planting cell 102 prior to receiving the seeds, e.g., prior to sowing. Planting material may be added to each planting cell 102 by hand or using machinery, which may be automated. The particular planting material used to fill a given seedling tray may vary as described herein.

The volume of each planting cell 102 filled with planting material may also vary and may depend on several variables selectable by the grower or necessitated by the specific seed varieties being sown. Such variables may include, for example, the length of time the emerging watermelon plants are allowed to grow within each cell prior to transplanting. In some examples, the volume of soil necessary to support adequate plant growth may be less than the volume necessary to support plant growth according to preexisting sowing approaches. In embodiments, the proportion of each cell volume filled with soil may range from about 10% to about 99%, about 20% to about 90%, about 30% to about 85%, or about 40% to about 80%.

A small cavity may be formed or dibbled in the planting material of each cell 102, into which a seed may be placed. The cavity may be positioned near the center of each planting cell and may be approximately 1 cm to 3 cm deep. The depth of each cavity may vary, and may be different for each seed type. For example, pollinizer seed cavities may have a greater depth than cavities formed for triploid watermelon seeds. Alternatively, seed cavity depth may be equal for each seed type. Cavities may be formed by hand and/or with the aid of a tool, e.g., a dibbling apparatus. In embodiments, a dibbling apparatus may be used to carry out or aid in the dibbling process. In some examples, the dibbling apparatus may comprise a rotary dibbler or may be a vertically-movable dibbler. In embodiments, a dibbling apparatus may be coupled with a mechanical sowing apparatus.

In some examples, cavities may be formed in the planting material of the seedling tray in a specific sequence that corresponds to a predetermined arrangement of triploid seeds 104 and pollinizer seeds 106. For instance, cavities may be first formed in the planting material of each cell 102 into which a triploid watermelon seed 104 is to be planted according to the predetermined arrangement. After placing a triploid watermelon seed 104 into each of the first-formed cavities, a next set of cavities may be formed in the planting material of the remaining cells, or at least the cells into which pollinizer seeds 106 are to be planted according to the predetermined arrangement. The reverse sequence may also be performed, in which pollinizer seed cavities are formed first, followed by cavities assigned triploid seeds.

An assortment of seeded types may be planted within the same seedling tray, provided that each tray includes seeds that produce seedless watermelon plants, e.g., triploid seeds, and seeds that produce watermelon plants capable of pollinating seedless watermelon plants, e.g., pollinizers.

One or more triploid seed varieties may be sown within the same seedling tray. In embodiments, different triploid seed types may be used interchangeably with the same or different pollinizer seed types. In some examples, particular triploid seed varieties may be used preferentially or exclusively with specific pollinizer seed varieties. Thus, growers may mix-and-match different seed types and experiment with various combinations of triploid seeds and pollinizer seeds to find advantageous combinations.

In some embodiments, one type of pollinizer seed may be used in a single seedling tray. In other embodiments, multiple types of pollinizer seeds may be used in a single seedling tray. In some examples, the pollinizer seed types may be derived from different sources, e.g., commercial suppliers and/or geographical growing regions. In embodiments, different pollinizer seed types may be used interchangeably with the same or different triploid seed types. Thus, successful pollination of seedless watermelon plants may not be limited to one or more specific pollinizer seed varieties. In some examples, particular pollinizer seed varieties may be used preferentially or exclusively with specific triploid seed varieties.

After selecting the particular seed types desired for a particular growing scheme, the seeds may be sown within seedling trays. Methods may involve sowing both triploid watermelon seeds and pollinizer seeds by hand. Hand sowing techniques may involve one or multiple sowing personnel trained to sow the seeds in particular arrangements. To enhance the efficiency of hand sowing, the seeds may be consistently organized according to a predetermined arrangement in each seedling tray. In particular, the location of each triploid seed and each pollinizer seed may be replicated within each seedling tray of a given size and cell count. Thus, sowing personnel may be trained to repetitively plant each seed in a pre-selected location. This consistent approach to sowing may reduce the time and expense associated with training sowing personnel, maximize sowing speed and/or diminish the likelihood of sowing errors. Some situations may necessitate altering the predetermined seed arrangement in response to changing conditions or information, e.g., weather, insect populations, yield data from previously-harvested plants, etc. In such scenarios, hand sowing may allow fast adjustment of sowing patterns without the need to re-program any equipment.

Figure 4:
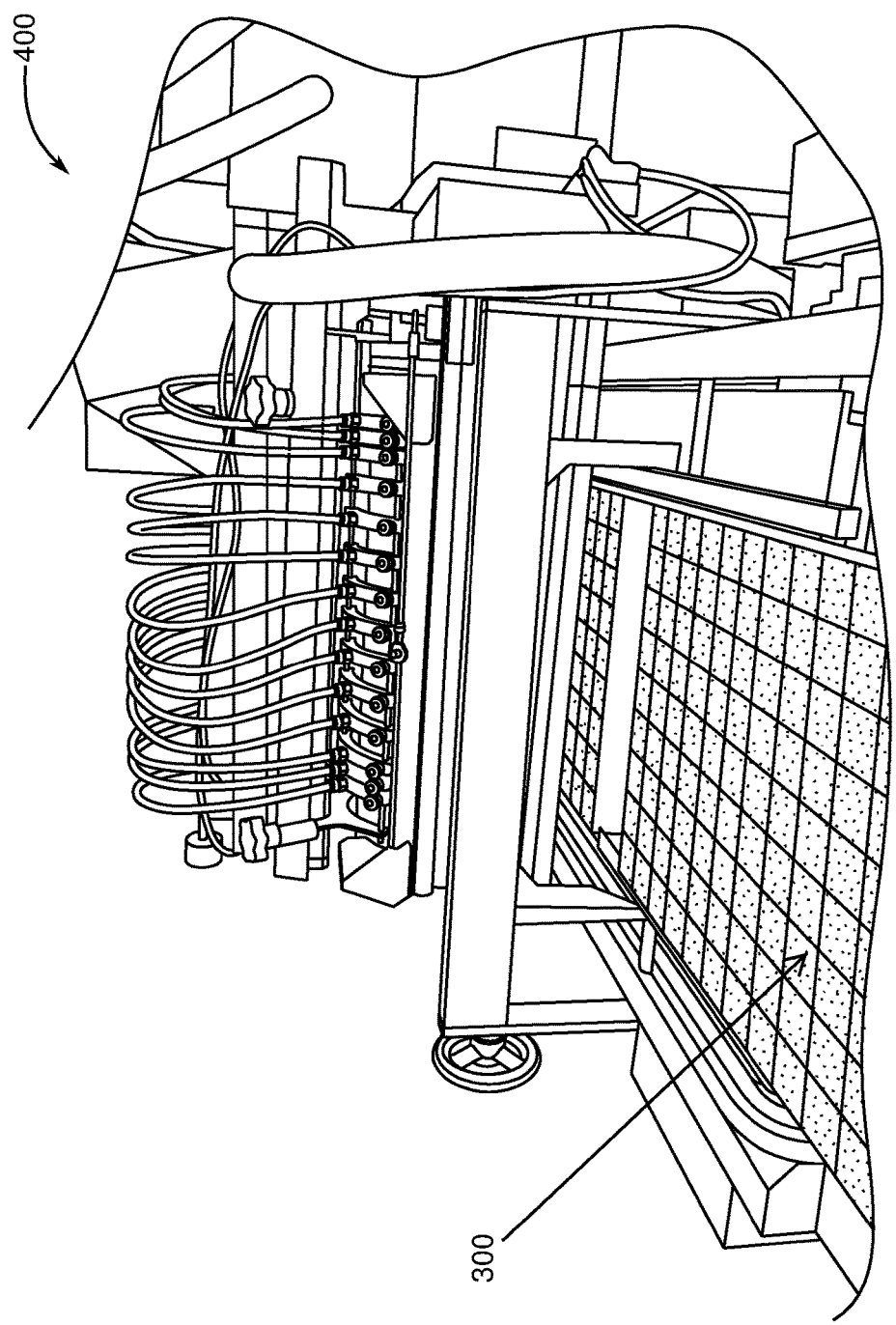
FIG. 4 is a schematic illustration of a perspective view of a mechanical seeder apparatus.

Some examples may involve mechanical sowing techniques. FIG. 4 is a schematic illustration of a mechanical seeder apparatus 400 that may be used to implement such techniques. As shown, one or more seedling trays, such as seedling tray 300, may be conveyed through the mechanical seeder apparatus 400. The mechanical seeder apparatus 400 may plant one watermelon seed within each planting cell 102 of the seedling tray 300 as the seedling tray 300 passes therethrough. Some examples may involve mechanical sowing of pollinizer seeds and triploid seeds using one or two passes. In other embodiments, a combination of hand sowing and mechanical sowing may be employed. According to such embodiments, one or more hand sowers may operate upstream and/or downstream of the planting operations of the mechanical seeder apparatus 400. For instance, hand sowers may plant a first seed variety in specific planting cells of a seedling tray before the seedling tray is conveyed through the mechanical seeder apparatus 400, which may then operate to plant the remaining cells of the seedling tray with a second seed variety. Such embodiments may involve hand sowers planting only the pollinizer seeds, while the mechanical seeder 400 plants only the triploid watermelon seeds, or vice versa. In some examples, the mechanical seeder apparatus 400 may not plant any seeds within a seedling tray, instead operating to fill each planting cell of the seedling tray with planting material prior to planting by one or more hand sowers. In addition or alternatively, the mechanical seeder apparatus 400 may dibble the planting material in each cell prior to planting. In embodiments, the operations of the mechanical seeder apparatus may vary and may include one or more additional functions involved in the planting process. The methods and equipment involved in mechanical sowing approaches may vary. In embodiments, one or more mechanical drum lines, e.g., vacuum drum lines, may be used. Some examples may involve one drum line used to sow triploid seeds, while the pollinizer seeds may be sown by hand. In another example, pollinizer seeds may be sown using a drum line, while the triploid seeds are sown by hand.

In some embodiments, the mechanical seeder apparatus 400 may include or be operatively coupled with a computing device. The computing device may include, in a basic configuration, one or more processors and system memory. Together, the processors and system memory may be used to control the planting operations of the mechanical seeder apparatus 400. In some examples, the computing device may be used to adjust the parameters of the mechanical seeder 400 to accommodate differently sized seedling trays. In addition or alternatively, the computing device may be used to adjust the ratio and/or pattern of watermelon seeds planted within each seedling tray by the mechanical seeder apparatus 400. In some examples, the computing device may be used to adjust the speed with which they seedling trays are conveyed through the mechanical seeder apparatus 400. An operator may adjust the speed in substantially real time to accommodate the maximum speed of one or more hand sowers operating in combination with the mechanical seeder 400.

Figure 2:
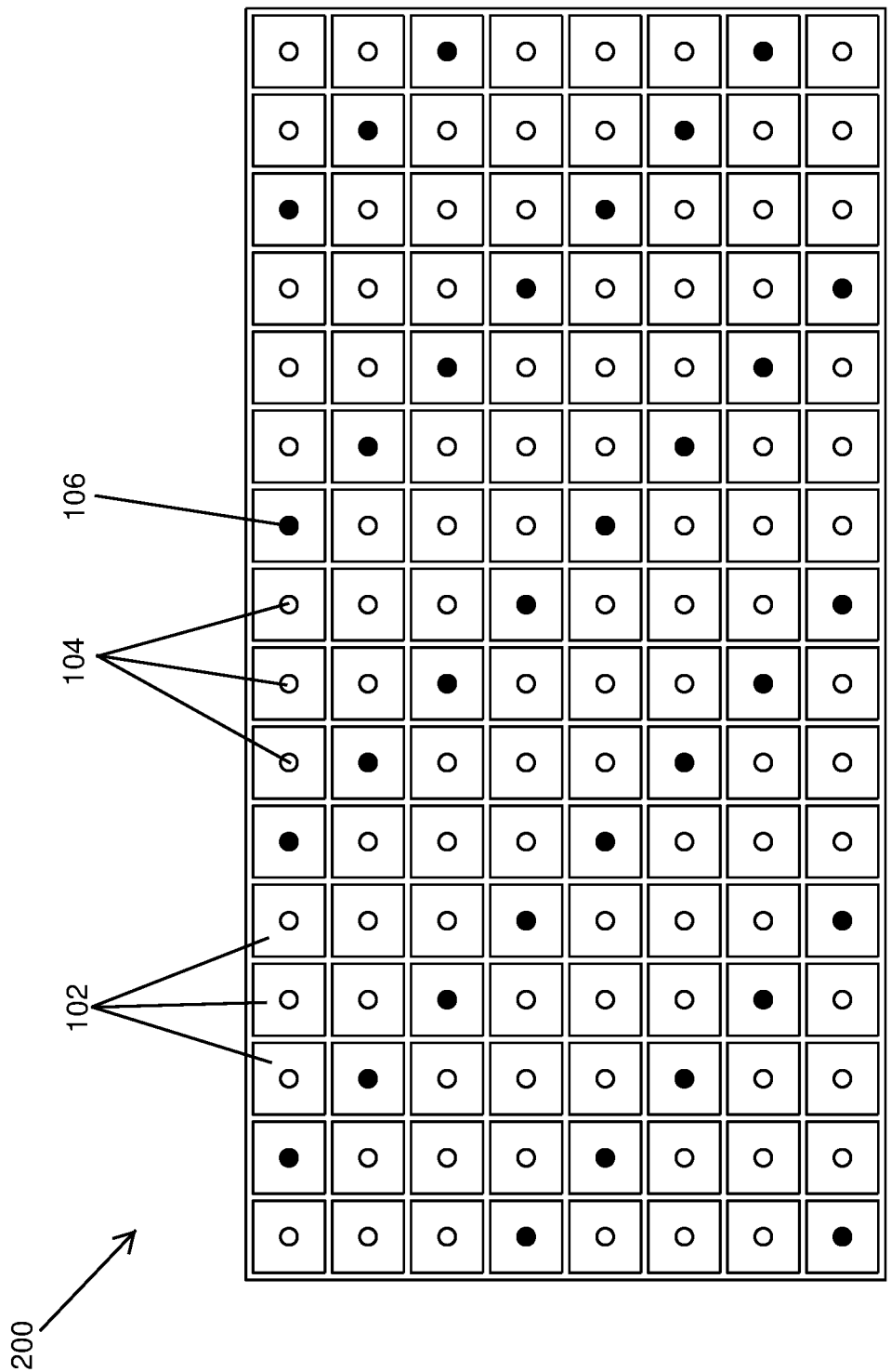
FIG. 2 is a schematic illustration of a plan view of another seedling tray containing triploid watermelon seeds and pollinizer seeds.
Figure 3:
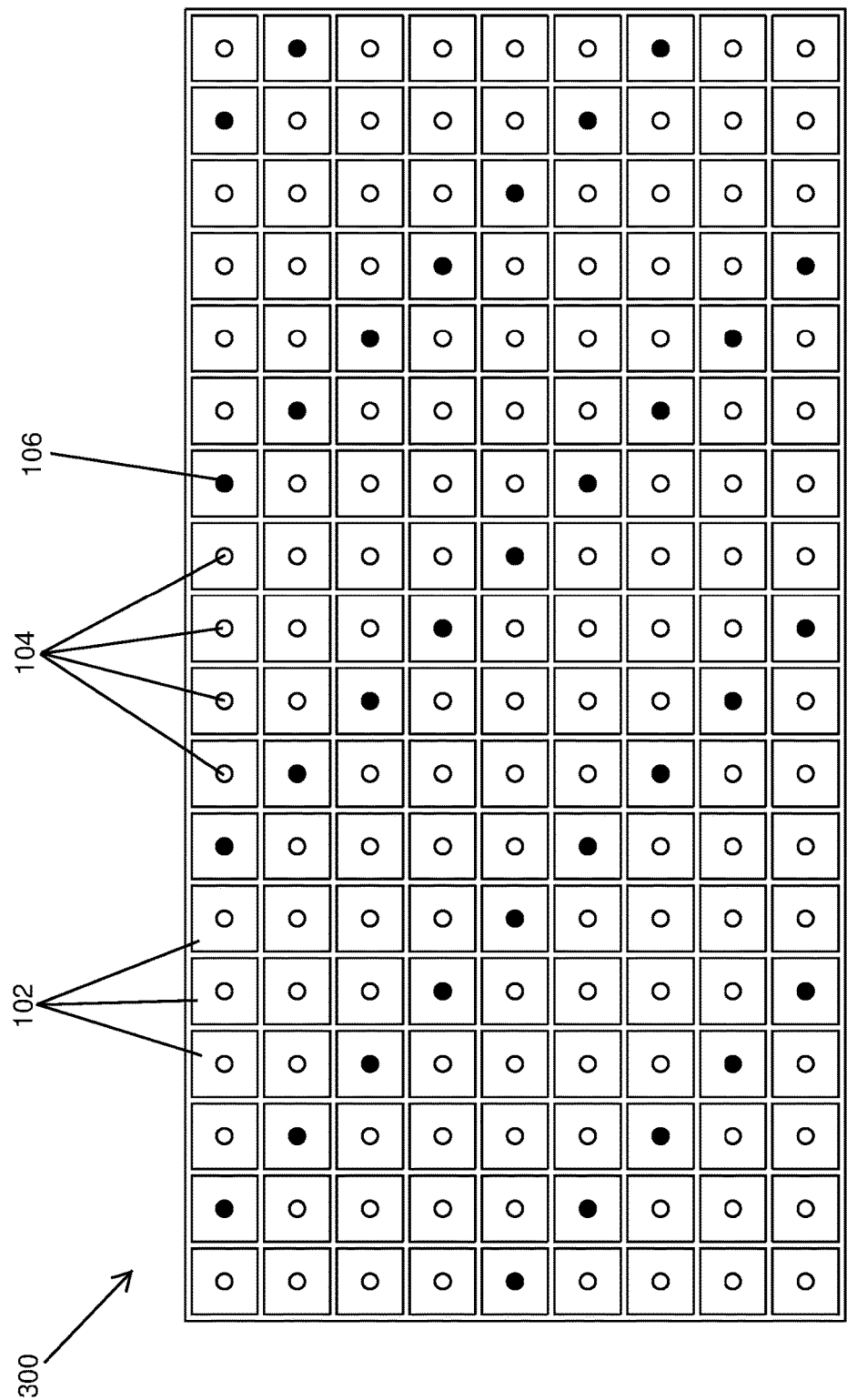
FIG. 3 is a schematic illustration of a plan view of another seedling tray containing triploid watermelon seeds and pollinizer seeds.

The seeds may be sown in each tray according to a predetermined arrangement. In embodiments, the predetermined arrangement may involve sowing one seed per cell of a seedling tray. Sowing more than one seed per cell may interfere with the germination and/or growth of triploid varieties. In some examples, the predetermined arrangement may be used to implement an adequate ratio of triploid seeds to pollinizer seeds. The adequate seed ratio may ensure that each seedless watermelon plant is pollinated by a pollinizer plant. Depending on one or more variables, e.g., seed type, transplanting location, etc., the particular seed ratio may vary. For instance, the ratio of pollinizer seeds to triploid seeds may be reduced for seeds that typically produce robust pollinizer plants. In addition or alternatively, the proportion of pollinizer seeds may be increased in embodiments where the transplanting location often harbors a low population of insect pollinators, e.g., bees. As shown in FIG. 1, the ratio of triploid seeds 104 to pollinizer seeds 106 may be about 2:1. FIG. 2 illustrates a 3:1 ratio of triploid seeds 104 to pollinizer seeds 106. The ratio of triploid seeds 104 to pollinizer seeds 106 shown in FIG. 3 is 4:1. In additional examples, the ratio of triploid seeds 104 to pollinizer seeds 106 may be about 6:1, 5:1 or 1:1 in each seedling tray.

While each cell within a seedling tray may include only one seed, the particular arrangement of triploid seeds relative to pollinizer seeds within each tray may vary. In FIGS. 1-3, for instance, the pollinizer seeds 106 are interspersed among the triploid seeds 104 in a consistent pattern within the seedling tray 100, 200, 300, such that the pollinizer seeds 106 are arranged in diagonal lines across each seedling tray. Predetermined arrangements may be discretionary and may depend in whole or in part on business considerations of the grower. In some examples, the arrangement may be constrained by the required ratio of triploid seeds to pollinizer seeds. Additionally, the transplanting field may impose restrictions on the arrangement of seeds within the tray, including, for example, the arrangement of already-transplanted watermelon plants in the field. In some examples, a seedling tray may include one or more solid rows of triploid seeds and/or pollinizer seeds. In other examples, triploid watermelon seeds may be interspersed with pollinizer seeds such that each row and/or column of a seedling tray includes at least one cell containing a triploid seed and one cell containing a watermelon pollinizer seed, such as the arrangement of seeds shown in FIGS. 1-3. Examples may also involve mingling triploid seeds and pollinizer seeds in a manner that maximizes positioning of pollinizer seed proximity to triploid seeds. For instance, FIG. 1 shows an arrangement in which a pollinizer seed 106 is positioned in every third planting cell 102 of seedling tray 100, such that every planting cell 102 containing a triploid seed 104 is positioned adjacent to a planting cell 102 containing a pollinizer seed 106. In the arrangement depicted in FIG. 2, every fourth planting cell 102 contains a pollinizer seed 106, and in FIG. 3, every fifth cell 102 contains a pollinizer seed 106. Additional embodiments may include a pollinizer seed 106 in every second, sixth, seventh, eighth, ninth or tenth cell of the seedling tray, with triploid seeds sown in every cell not occupied by a pollinizer seed.

Seeds may also be organized such that each seedling tray has mirror image symmetry with respect to the seeds planted therein. Organizing each seedling tray according to such a symmetrical predetermined arrangement may allow seeds in each cell of the tray to be identified regardless of the orientation of the tray. Thus, the arrangement of seed varieties within each seedling tray may be identical, regardless of the orientation of each seedling tray. This organizational approach may further reduce the likelihood of sowing and/or transplanting errors, especially while transporting the seedling trays. In addition, this organizational approach may reduce and/or simplify the amount and/or intricacy of labeling required for each seedling tray with certain cell markers, e.g., colored dyes, stakes, and/or tags, thereby further reducing the time, costs, and maintenance involved in the sowing methods disclosed herein.

Sowing seeds within seedling trays according to a predetermined arrangement, which may involve only one seed sown per cell, may facilitate plant type identification, thereby distinguishing cells containing triploid seeds from cells containing pollinizer seeds. By readily distinguishing the seed and/or plant type located in each cell in the tray, methods may reduce transplanting errors. In some examples, predetermined arrangements of each seedling tray may simply be recorded and saved for later reference. In embodiments, seed arrangements may be saved in system memory of the computing device of a mechanical seeder apparatus 400.

Embodiments may avoid sowing more than one seed per cell in the tray. This aspect may facilitate preexisting seedling transplant protocols. For example, growing personnel may be trained to discard plants that grow in pairs within a single cell, so-called "double plants." Thus, the disclosed sowing schemes may further reduce the time required to train growing personnel.

By providing each seed with a designated growing space defined by each cell of a seedling tray, the methods disclosed herein may also reduce or eliminate competition between triploid plants and adjacent pollinizer plants during germination, growth and development. Reduced competition may relate to the planting material, nutrients, water, light, air and other resources allotted to each planting cell that, because only one seed is planted per cell, are not shared by multiple seeds or plants. For example, according to the methods disclosed herein, the designated growing space afforded to each seed within a cell may maximize the space available for nascent roots to extend, thereby eliminating or reducing the root crowding that may result from growing two or more plants in close proximity within single seedling cells. Less root crowding may lead to faster, more complete root growth, increase greenhouse turnover and boost overall yields. By reducing or eliminating competition in the seedling trays, a wider variety of pollinizer seeds, e.g., non-enhanced seed types, may also be utilized.

Reduced competition between plants within the seedling trays may result in improvements to plant performance and/or the protocols implemented to sow, grow and transplant. For example, lack of competition for water with neighboring plants in a seedling tray may improve the germination rate and/or development of each plant. Excessive drying of the planting material within each cell, a common occurrence in multi-seeded cells, may also be avoided or reduced. In addition or alternatively, sowing only one seed per cell may reduce the likelihood of over-watering of cells, which occurs when both multi-seeded cells and single-seeded cells are used in the same tray, thereby decreasing the likelihood of overgrowth and/or over-stretching the plants. Accordingly, a one-seed-per-cell sowing scheme may simplify watering protocols for each seedling tray. For instance, single-seeded and multi-seeded cells may require different volumes of water, e.g., multi-seeded cells may demand a greater amount of water than single-seeded cells. By unifying each seedling tray to include only one seed per cell, water requirements may be uniform across each row and column within a given seedling tray, thus further reducing the likelihood of maintenance errors and improving the efficiency of watering protocols.

One or more of the watering advantages associated with mingling both triploid and pollinizer seeds in each seedling tray may continue upon transplantation into a field. For example, plants afforded a dedicated growing space within seedling trays may require less moisture relative to double-plants forced to share single planting cells. As a result, plants sown according to the methods herein may be transplanted into non-irrigated and/or lightly-irrigated field sites. In some examples, mingled plants may be transplanted into fields located in arid climates where plants sown according to other techniques may not survive or develop properly.

Methods disclosed herein may also reduce and/or eliminate the competition for light between triploid and pollinizer plants growing in the same cell. For example, pollinizer plant parts, especially the leaves, may cast shadows on developing seedless plants in close proximity, thereby hindering the growth of certain seedless plants and/or skewing their growth toward one or more directions that remain unobstructed by pollinizer shadows.

The length of time the watermelon plants are grown in seedling trays may vary. In embodiments, plants may be grown in seedling trays for about three to about eight weeks. After given sufficient time to develop within the seedling trays, the young watermelon plants may be transplanted directly into production fields where they are eventually harvested. Plants may also be transplanted to larger containers. During transit to the field, trays may be loaded into racks without the need to keep any trays separate from others.

Plants may be transplanted into the field in the same predetermined arrangement in which the seeds were previously sown in the seedling trays. Accordingly, growing personnel may remove the plants from the trays and transplant them into a field without shuffling, rearranging or interspersing plants from separate seedling trays within individual field rows. In addition, implementing precautionary measures may be unnecessary during transplanting to ensure that the desired percentage of pollinizer plants, in the proper arrangement, are included in the field. That is, the plants may be planted in the field in the same order they are sown in the seedling trays without concern for whether each triploid plant is placed sufficiently close to a pollinizer plant. Consequently, transplanting efficiency may be improved. Increased transplanting efficiencies may translate into an increased acreage of fields planted per day, week, month, season and/or year. Less field management may also be required throughout the transplanting process.

In embodiments, row spacing between each plant, regardless of seed type, may be equal. In some examples, spacing between the plants may maximize pollen dispersal. For example, by not clustering pollinizer plants in close proximity to particular triploid plants, the methods disclosed herein may avoid preferential dispersion of pollen via air and/or insects to specific triploid plants.

In addition, disclosed embodiments may enable the germ amount and/or percentage for pollinizers and/or seedless watermelon plants to be determined, even when germ performance is poor.

While this invention has been described with reference to exemplary embodiments, it will be understood by those skilled in the art that various changes can be made and equivalents may be substituted, without departing from the spirit and scope of the invention. In addition, modifications may be made to adapt the teachings of the invention to particular situations and to use other materials, without departing from the essential scope thereof. The invention is thus not limited to the particular examples that are disclosed here, but encompasses all of the embodiments falling within the scope of the claims.

What is claimed is:

1. A method of sowing watermelon seeds, comprising: seeding triploid watermelon seeds and watermelon pollinizer seeds in separate cells within a single seedling tray, wherein the triploid watermelon seeds produce plants bearing seedless watermelons and the pollinizer seeds produce plants bearing seeded watermelons, wherein the plants bearing seeded watermelons are not bred to have reduced competition to the plants bearing seedless watermelons, wherein reduced competition comprises smaller leaves than leaves grown from the plants bearing seedless watermelons.

2. The method of claim 1, wherein the triploid watermelon seeds or the watermelon pollinizer seeds are seeded by hand in the seedling tray.

3. The method of claim 2, wherein each of the triploid watermelon seeds and watermelon pollinizer seeds are seeded by hand in the seedling tray.

4. The method of claim 2, further comprising using a mechanical seeder to seed at least a portion of the triploid watermelon seeds or the watermelon pollinizer seeds in the seedling tray.

5. The method of claim 1, wherein the one or more of the triploid watermelon seeds and watermelon pollinizer seeds are seeded by a mechanical seeder in the single seedling tray.

6. The method of claim 1, wherein the triploid watermelon seeds comprise one or more varieties of triploid watermelon seeds.

7. The method of claim 1, wherein the watermelon pollinizer seeds comprise one or more varieties of watermelon pollinizer seeds.

8. The method of claim 1, wherein the watermelon seeds are seeded at a ratio of triploid watermelon seeds to watermelon pollinizer seeds of about 5:1, 4:1, 3:1, or 2:1 in the single seedling tray.

9. The method of claim 1, wherein the single seedling tray comprises a watermelon pollinizer seed in every second, third, fourth, fifth, or sixth cell.

10. The method of claim 1, wherein the single seedling tray containing the triploid watermelon seeds and the watermelon pollinizer seeds has mirror image symmetry.

11. The method of claim 1, further comprising seeding, by hand, triploid watermelon seeds and watermelon pollinizer seeds in separate cells within one or more additional seedling trays.

12. The method of claim 1, further comprising growing the triploid watermelon seeds and watermelon pollinizer seeds in the single seedling tray for a preliminary growth period to produce seedless watermelon plants and watermelon pollinizer plants.

13. The method of claim 12, wherein the preliminary growth period is about three to about eight weeks.

14. The method of claim 12, further comprising transplanting the seedless watermelon plants and watermelon pollinizer plants in a field after the preliminary growth period.

15. The method of claim 14, wherein the seedless watermelon plants are pollinated by the watermelon pollinizer plants.

16. The method of claim 12, further comprising adding an equal amount of water to each cell of the single seedling tray at consistent intervals during the preliminary growing period.

17. The method of claim 12, wherein the watermelon pollinizer plants develop into the plants bearing seeded watermelons, the seeded watermelons bearing seeds and having a moisture content approximately equal to the seedless watermelons.

18. The method of claim 12, wherein the watermelon pollinizer plants grow at a faster rate than the triploid watermelon plants.

19. A sown seedling tray, comprising:
a seedling tray including a plurality of individual planting cells;
planting material arranged within the planting cells; and
one watermelon seed per cell, wherein the watermelon seed is a triploid watermelon seed or a pollinizer seed, the triploid watermelon seed producing a plant bearing a seedless watermelon and the pollinizer seed producing a plant bearing a seeded watermelon, wherein the plant bearing the seeded watermelon is not bred to have reduced competition for the production of triploid watermelons, wherein reduced competition comprises smaller leaves than leaves grown from the plant bearing the seedless watermelon.

* * * * *